United States Patent [19]

Wuest

[11] Patent Number: 5,209,941
[45] Date of Patent: May 11, 1993

[54] PROCESS AND DEVICE FOR PREPARING MEALS

[75] Inventor: Ernst Wuest, Abtwil, Switzerland

[73] Assignee: Menu System Wuest & Co., Switzerland

[21] Appl. No.: 656,157

[22] PCT Filed: Aug. 3, 1990

[86] PCT No.: PCT/CH90/00187
§ 371 Date: Apr. 30, 1991
§ 102(e) Date: Apr. 30, 1991

[87] PCT Pub. No.: WO91/01674
PCT Pub. Date: Feb. 21, 1991

[30] Foreign Application Priority Data

Aug. 3, 1989 [CH] Switzerland .................. 2883/89

[51] Int. Cl.⁵ .................. A23L 1/00; F24D 1/00
[52] U.S. Cl. .................. 426/510; 99/330; 99/339; 99/468; 219/401; 426/511; 426/523
[58] Field of Search .............. 426/510, 511, 231, 523; 99/330, 339, 468; 126/369; 219/401

[56] References Cited

U.S. PATENT DOCUMENTS 3,808,963  5/1974  Ludena .................. 99/339
4,058,635  11/1977  Durth .................. 426/510
4,585,661  4/1986  Brummett .................. 426/510
4,700,685  10/1987  Miller .................. 426/510
4,835,368  5/1989  Fortmann et al. .................. 126/369

FOREIGN PATENT DOCUMENTS 0233535  8/1987  European Pat. Off. .
0277337  8/1988  European Pat. Off. .
2659865  8/1977  Fed. Rep. of Germany .
8131827  3/1983  Fed. Rep. of Germany .
1414942  9/1965  France .
2624105  6/1989  France .

Primary Examiner—George Yeung
Attorney, Agent, or Firm—Wegner, Cantor, Mueller & Player

[57] ABSTRACT

Frozen meals are placed in a hermetically sealable cooking space (2) in which explosion-like puffs of steam are produced. Before the puffs of steam are produced, the air present in the cooking space can be heated. The puffs of steam are produced by evaporation of dosed quantities of water. Water is introduced into the cooking space (2) through a nozzle (40) which opens into the cooking space. The means can be regenerated or even cooked with the greatest possible care in the shortest possible time without detriment to their quality.

33 Claims, 2 Drawing Sheets

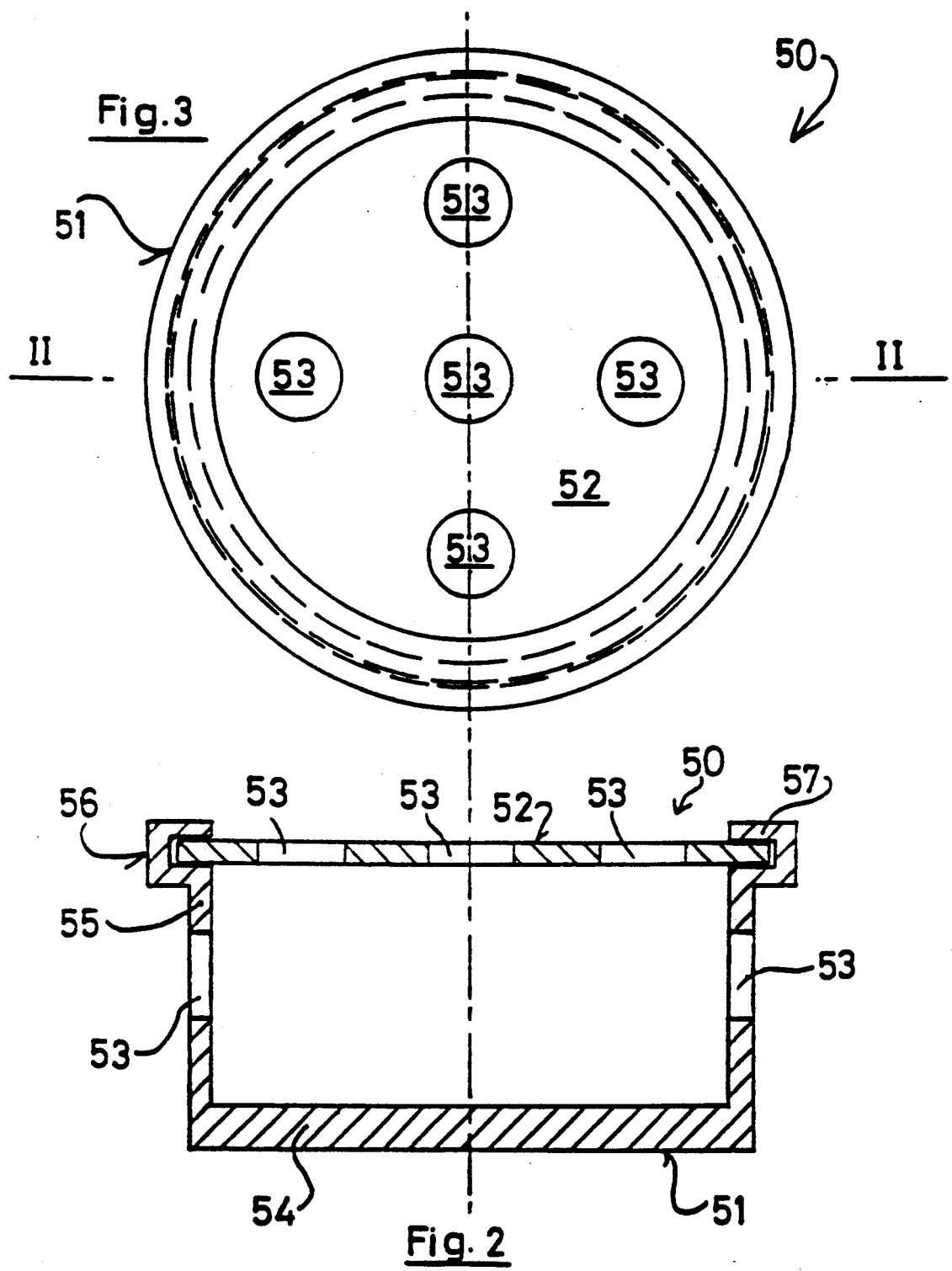

PROCESS AND DEVICE FOR PREPARING MEALS

The present invention relates to a process for preparing meals and to a device for carrying out this process.

When a number—or even a large number—of people have to be served with meals within a short space of time, it is quite usual for the meals to be prepared in advance, deep-frozen or chilled in individual-sized portions, and only regenerated immediately before serving. In such situations it is important that the food can be regenerated in the shortest time possible. Steam can be used for the regeneration process, since it contains a great amount of thermal energy. The frozen or chilled food is, however, enclosed in sealed containers so that the steam cannot penetrate to the food itself. The times required for the regeneration by means of steam are too long in terms of the given situation.

The object of the present invention is to indicate a process which eliminates the stated disadvantage.

According to the invention, the stated object is achieved in the process of the generic type mentioned in the introduction as is defined in the defining clause of claim 1.

A device suitable for carrying out this process is defined in the defining part of claim 7.

Embodiment possibilities of the present invention are explained in greater detail below with reference to the attached drawing, in which:

FIG. 2 shows as a diagram and in a vertical section a container, representing a further component of the present invention and FIG. 3 shows in horizontal projection the container according to FIG. 2.

Figure 1:
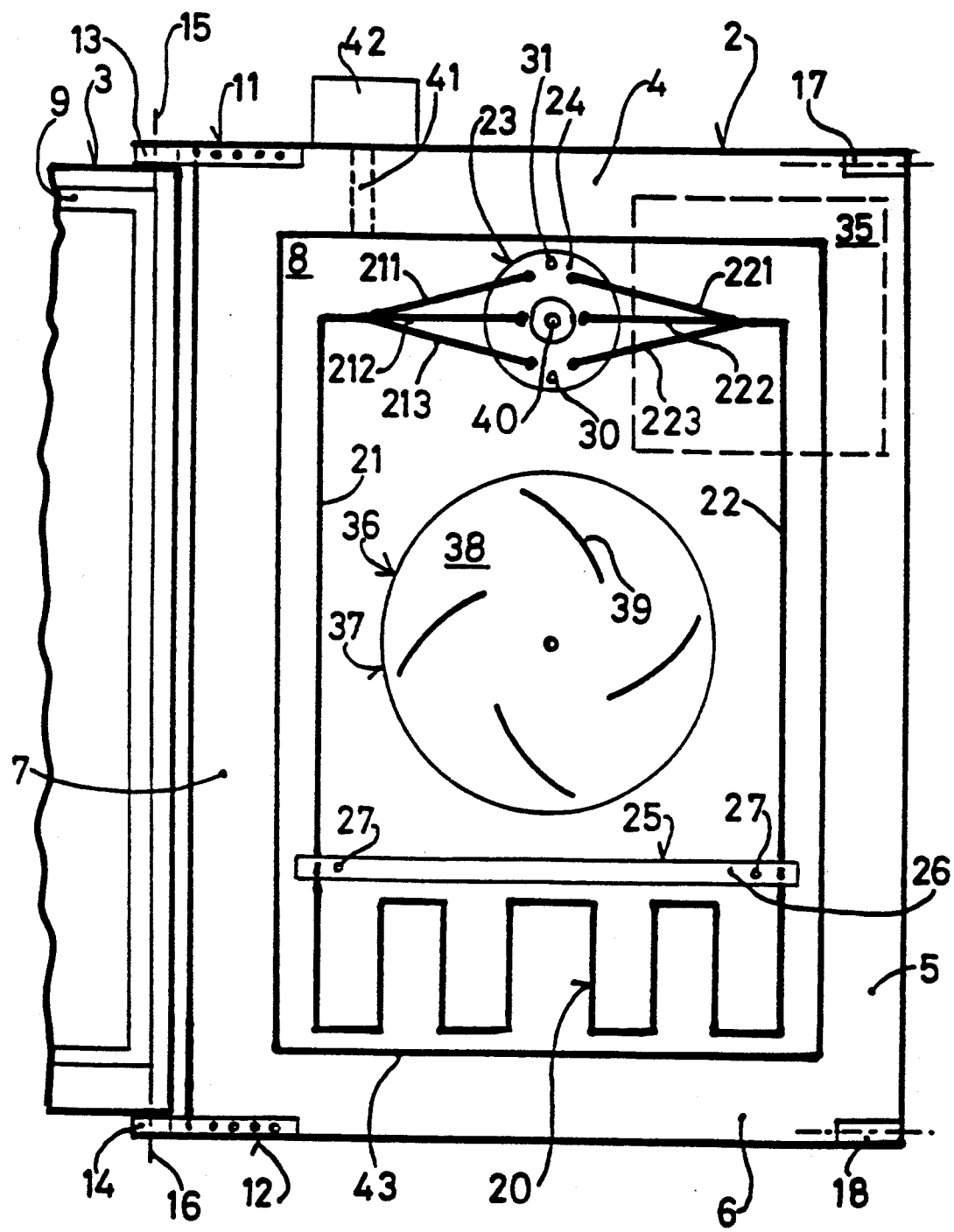
FIG. 1 shows the main part of the present device in a front view.

The part of the present device for preparing meals represented in FIG. 1 has an oven. This oven includes a virtually parallelepiped casing or shell 2, which delimits a cooking space for the food to be prepared. One of the walls of the casing 2 is manufactured as a door; in the model shown this is the front wall 3. The casing 2 also includes four lateral walls 4, 5, 6 and 7, as well as a rear wall 8.

The walls 3–8 of the casing have an outer envelope and an inner envelope (not shown), which are made of an impact resistant material, e.g. metal. Between these layers is a thermally insulating material of known type. The walls of the casing 2 are consequently relatively thick, as can be seen from the lateral walls 4, 5, 6 and 7 of the casing 2 in the drawing.

The door 3 allows access to the cooking space so that the food to be prepared can be loaded and unloaded. The door is constructed in such a way that it can be hermetically or pressure sealed. This is especially important in the present case since there is considerable overpressure in the cooking space at certain times while the oven is working. In order to make it possible to vacuum seal the cooking space, a self-contained strip 9 of a flexible material is attached to the inside of the door 3 and projects from the inside surface of the door. This sealing strip 9 is fixed to that part of the inside of the door 3 opposite the surface already mentioned of the lateral walls 4–7. When the door 3 is closed the sealing strip 9 lies tight against the surface of the lateral walls 4–7 of the casing 2.

Hinges are fixed in the region of one of the vertically running lateral walls 7 of the casing 2. These hinges are basically in the form of material strips attached to the surface of the horizontal casing walls 4 and 6, for instance by means of screws. These hinges 11 and 12 are close to the outside edge, respectively to the outer envelope, of the casing wall 4 or 6 respectively and are relatively narrow. The hinges 11 and 12 have an eyelet-shaped section 13, respectively 14, which projects from the outside of the vertical lateral wall. The eyelet sections 13 and 14 can be bent out of the plane of the surface of the lateral walls 4–7 in order to be able to compensate for the thickness of the sealing strip 9.

The height of the door 3 is less than the height of the vertical walls 5 and 7 of the casing by at least twice the width of the strip-shaped hinges 11 and 12. There is thus room for one of the vertical borders of the door 3 between the hinge strips 11 and 12, particularly between the eyelet-shaped sections 13 and 14 of the same. At those points of the horizontal edge of the door 3 that are near the eyelets 13 and 14, there are pegs 15 and 16 which project vertically from the edge of the door. These pegs 15 and 16 are surrounded or held by the eyelets 13 and 14 of the hinges 11 and 12 so that the door 3 can be swivelled on the axis that passes through the pegs 15 and 16.

Snap-catches 17 and 18 for the door 3 are fixed onto the surface of the opposite casing wall 5, which is also vertical. These catches 15 and 16 are constructed as rollers in the model shown, with a virtually horizontal axis. The rollers in the oven casing are on a spring and can be swivelled out vertically from their original position. The catches 17 and 18 are very near to the outer edge, or outer shell respectively, of the horizontal walls 4 and 6. There are recesses in the edge surfaces of the vertical border of door 3 (opposite the hinged edge) where the rollers of the catch 17, respectively 18, can fit in.

Inside the cooking space and inside housing 2 respectively, there is a heating element 20, which advantageously is an electrical heater. The heating element 20 is attached to the inside of one of the casing's secured walls. In the example given, the heating element 20 is on the inside of and a distance away from the rear wall 8 of the casing. To transfer thermal energy to the cooking space as quickly as possible, the actual heating element 20 is virtually zigzag shaped to considerably lengthen the element. The curves of the zigzag form lie in a plane which is virtually parallel to the rear wall 8 of the casing. The heating element 20 is situated in the lower area of the cooking space, as it is known that warm air and superheated steam rise.

The feeder legs 21 and 22 are connected to the actual heating element. Feeder pipes are situated in these feeder legs 21 and 22, leading to the heating element 20. These feeder legs run virtually in a straight line and reach up from the heating element, where they join together in the middle section of the oven casing. In this oven section, an outlet 23 is made in the casing rear wall 8. The feeder legs 21 and 22 leave the interior of the casing through this outlet 23. The outlet has a plate 24 with a circular outline. The thickness of this plate is about the same as the rear wall 8 of the oven and can be sealed into the rear wall 8. To this end a screw thread can be added to the exterior wall of the outlet-plate 24, which can be screwed into a corresponding thread in the rear wall 8.

The amount of thermal energy within the cooking space can be increased further by using several of the aforementioned heating elements. In the depicted example, three similar heating elements 20 are placed alongside or above each other. The drawing depicts the feeder legs 211, 212, 213 and 221, 222, 223 respectively. These feeder legs 211 to 223 bend off at different angles with respect to the vertical legs 21 and 22, so that each can be assigned a separate route into the outlet 23.

A bracket is needed to position, then to secure, the heating element 20. This bracket surrounds a yoke, which takes the form of a small rail. A second small rail (not depicted) is assigned to the yoke and lies between the casing rear wall 8 and the yoke 26. The straight legs 21 and 22 of the heating element 20 are situated between the above-mentioned main rail and the yoke 26. The yoke 26 and the main rail are fixed to the rear wall 8 with screws. If several heating elements 20 are to be housed in the cooking space, they should lie next to each other in the manner described above. In that case, intermediate rails (not depicted) are situated between the individual heating elements 20. There can be recesses on the yoke 26 and the other rails of the bracket 25, in which the feeder legs 21 and 22 can sit.

Inside the cooking space there is also a thermometer sensor 30. The thermometer sensor 30 is assigned to the plate 24 of the outlet 23, below the connecting passages of the heating element feeders 211 to 223, thus keeping to a minimum the effect on it of the heat produced in the heater feeders. The lines of the thermometer sensor 30 leading outside go through the plate 24 of the outlet 23. There is also a pressure gauge sensor 31 in the cooking area. The pressure gauge sensor is also assigned to the plate 24 of the outlet 23 and the lines of this sensor 31 leading outside also go out through the plate 24 of the outlet 23.

The lines of the thermometer gauge sensor 30 and the pressure gauge sensor 31 that lead to the outside are connected to a controlling device 35, which is on the exterior of the housing rear wall 8. This controlling device 35 forms another component part of the present appliance and is assigned outside the cooking space.

The appliance also has a ventilator 36, which can be controlled by the controlling device 35. This ventilator 36 contains a turbine wheel 37, which is secured to the shaft of a deck motor. The turbine wheel is inside the cooking space, while the motor is assigned outside the cooking space. The turbine wheel 37 is placed as close as possible to one of the fixed walls of the oven casing. In the depicted example, the ventilator 36 is assigned to the rear wall 8 of the oven.

The turbine wheel 37 can have a disc 38 secured to the center of the primary shaft. This disc 38 can be built into the oven wall. There are ridges 39 on the surface of the disc 38 which faces into the cooking area. The ridges stand clear of the surface and run in an arch shape. The tangents to the middle of such a ridge form a 45 degree angle with the tangents in this section of the perimeter of the disc 38.

The deck motor of the ventilator 36 is located outside the cooking space, so that the main shaft goes through the appropriate wall 8 of the oven housing. The penetration point of the deck motor is air tight. The main purpose of the turbine wheel 37 on the shaft is to circulate the air and steam in the cooking space. This circulation means the temperature in the cooking space is virtually constant throughout the preparation of the food.

A nozzle 40 leads into the cooking space, through which water can be channelled into the cooking space. This nozzle is set into the plate 24 of the outlet 23 and the end of the nozzle outside the cooking space is connected to a water source. This source (not depicted) is also outside the cooking space and is controlled by the controlling device 35. The water source is set up in such a way that small doses of water can be forced into the cooking space through the nozzle 40. The water source contains a pump, which can release fixed doses of water.

The nozzle 40 can be arranged in such a way that the nozzle opening is directed into the interior of the cooking space. The nozzle 40 can however also be arranged so that it is directed against one of the components of the cooking space, which can create water vapour or steam from the water being sent through. If the nozzle 40 is directed against the turbine wheel 37 of the ventilator 36, the water entering the cooking space by means of a jet through the nozzle 40 is changed into water vapour through the rotating turbine wheel 37. This water vapour quickly changes to steam because of the heaters 20 located in the cooking space. If the nozzle 40 is directed against the heaters 20, the water is changed into steam immediately.

In addition to the opening in the oven housing which can be closed by means of door 3, there is a second opening 41 which is a channel into one of the walls 4 to 8 in the oven casing. The profile of this channel 41 is small but the size of this cross-section is variable. For the sake of simplicity, the opening 41 is shown on the diagram to be in the ceiling 4 of the cooking space. The size of the cross-section of opening 41 can be adjusted using the control valve 42 of a type known in the art. On the example given, this valve 42 is assigned to the outer mouth of opening 41. The valve 42 is connected to the controlling device 35 and the size of the cross-section of the channel 41 is adjusted on the basis of commands given by the controlling device 35. The valve 42 can be built into the casing of the cooking space, advantageously in one of the fixed walls. The sealable channel 41 provides a connection controlling the flow of air between the interior of the cooking space and the surroundings of the present appliance.

The controlling device 35 is designed to control the interaction of the individual component parts of the present appliance. The controlling device 35 also contains a mechanism for determining periods of time, i.e., a clock or timing pulse generator (not depicted). Such mechanisms are known in the art and are easily obtainable.

The present device also includes containers 50 to hold the food to be prepared. One of these containers is shown in diagrammatic form in FIG. 2 and 3. The container 50 has a lower part 51 and a lid 52, and there are perforations 53 in the lid. The lower part of the container 51 has a base 54 and a wall 55, the wall 55 being connected to the edge of the base 54. There are devices 56 on the free edge of the container wall 55 to hold the lid 52 onto the lower part 51. These devices 56 can take the form of a strip of material all around the periphery which encompasses the edge of the lid 52. The perforations 53 can also be in wall 55 and/or in floor 56 of the container 50, as shown in simple diagrammatic form in FIG. 2. Steam can enter the container 50 via the perforations 53 and then penetrate the spaces between the ingredients inside each container. The containers 50 can be placed on the floor 43 of the cooking space and/or on a suitable stand or additional floor (not depicted) located in the cooking space.

Food is placed in the cooking space, the cooking space is made air tight by closing door 3 and, by means of a control button on the controlling device 35, the required manner of preparation of the food within the cooking space is selected.

While the food is being prepared, explosion-like bursts of steam can be seen within the cooking space. These bursts of steam cause a sudden increase in the pressure within the cooking space, which encourages the steam to penetrate as far as the food within each bowl. As already stated, in this manner steam can enter the spaces between the food and ingredients respectively within the container, as it is well known that most foods have an uneven surface, with cracks or fissures. Furthermore there are also gaps between the ingredients within the container.

Before the first jet of steam, it is advisable to warm the air within the cooking space. This is achieved by means of the previously mentioned heaters. The above-mentioned valve is closed during this heating phase so that there is no flow of air between the interior of the cooking space and the exterior of the present appliance. As the air inside the cooking space is heated, the pressure inside the air-tight cooking space is increased. The warming of the air inside the cooking space begins to have an effect on the food inside, which is still frozen. The surface layer of the food is thawed.

This warming-up or heating phase is ended as soon as the thermometer registers a temperature of about 90 to 100 degrees Centigrade. Where food only needs regenerating, this warming-up phase ends when a temperature of about 90 degrees Centigrade is reached. When food needs baking, toasting, steaming etc. the warming-up phase ends when the temperature reaches about 100 degrees Centigrade.

At the end of the warming-up phase, the valve can be opened to allow air, which may be mixed with the moisture produced while the surface layer of the food was thawing, to escape out of the cooking space via the channel in the valve, until the pressure in the cooking space is approximately equal to the ambient pressure. When this ambient pressure is reached, it is registered by the above-mentioned pressure sensor in the cooking space which transmits a corresponding signal to the control device. As a result of this signal, the sealable channel in the casing of the cooking space, i.e. the valve, is closed and puffs of steam can start being produced in the cooking space.

In certain circumstances, it may be more convenient to keep the valve open during the warming-up phase. This valve, respectively the opening in it, is closed when a previously set temperature is reached, and puffs of steam can start being produced in the cooking space.

In order to produce puffs of steam, water is introduced into the cooking space via the nozzle. This can be achieved by injecting water into the cooking space. The water may, however, also be introduced into the cooking space in the form of water vapour, i.e. sprayed. In these cases, the jet of water is simply directed against the inside of the cooking space. As the air in the cooking space is at the stated relatively high temperature, the injected or sprayed water turns into steam inside the cooking space.

In certain applications with this process, it is convenient for the water jet sprayed into the cooking space via the nozzle to be directed against one of the component parts of the cooking space. These component parts can convert the water into water vapour and/or steam. If water is sprayed against the turbine wheel of the ventilators, the rapid rotation of the wheel first causes it to turn into water vapour which is then converted into steam, due to the high temperature inside the cooking space. If the water is directed against the heating element, it immediately turns into steam.

It is clear that steam can also be produced outside the cooking space and the steam thus produced can then be introduced into the cooking space through the nozzle. This may be convenient in certain cases where this process is applied. However, for this, a second heating element is required which must be fitted outside the cooking space.

When steam is produced, the pressure suddenly increases in the cooking space, which is now once more hermetically sealed, thus causing the puffs of steam previously mentioned. The peak pressure can rise to 0.7 bar. In order to produce such puffs of steam, measured doses of water can be introduced into the cooking space. Such a dose can, for instance, contain 2 to 3 grams of water or even less. Such small doses of water come from the above-mentioned water source to which the nozzle is attached. The more water is introduced into the cooking space, the more the over-pressure inside it increases, since it is assumed that the heating element can produce sufficient heat, and the longer the over-pressure in the cooking space is maintained during this time. The steam inside the cooling space transmits part of its heat to the food and condenses. The fall in the temperature of the steam also causes, among other things, a drop in pressure in the cooking space.

The pressure inside the cooking space is monitored by the previously mentioned pressure gauge. When the pressure in the cooking space drops to a previously set figure, e.g. to 0.025 bar, another dose of water is injected into the cooking space and converted into steam. The time lapse between two consecutive injections of water into the cooking space may be 10 seconds, for instance. The length of this interval is generally variable and in most cases increases from one injection to the next. This is because the food is getting warmer and warmer while it is being steam-treated, so that it absorbs the heat transmitted by the steam more and more slowly. If it is considered preferable to maintain a constant interval between injections throughout the entire process, the amount of water required to produce the consecutive puffs of steam can be reduced correspondingly.

If, at the end of the food processing, the production of another puff of steam depends only on a given drop in pressure inside the cooking space having been produced by the previous puff of steam, the previously mentioned device for measuring time intervals can measure the time that elapses between two consecutive puffs of steam. If this interval exceeds a given set time it can be concluded that the food-processing is finished. The monitoring device then automatically stops the production of any more puffs of steam. The length of time during which food is subjected to the puffs of steam can, however, also be set to a definite value for particular kinds of processing and food, so that the production of puffs of steam automatically stops once this time is up. At the end of the processing, it is advisable for the opening in the casing around the cooking space to remain closed.

It is possible to achieve a more intensive treatment of the food by briefly opening the orifice in the casing of the cooking space before injecting the next dose of water, so that the pressure in the cooking space drops to equal the ambient pressure. This means that the pressure in the cooking space can drop to that of its surroundings as long as the cooking space is thus open. Afterwards the opening in the casing of the cooking space, e.g. the valve, is closed and another dose of water can be injected into the cooking space.

The moment at which the orifice in the cooking space casing is temporarily opened can, however, also be linked to a pre-set interval of time elapsed since the last previous injection of water.

It also depends on the particular program selected for the food processing as to how long the interval must be between two consecutive temporary openings of the valve. The number of puffs of steam to which the food is subjected also depends, among other things, on the kind of processing required, the type and the amount of food being processed, etc. The relevant data for a given case can be entered by means of a keyboard known in the art of similar situated on the controlling device. The controlling device then automatically carries out the actual processing.

If the food is not intended to be served immediately after the processing is finished, it is most advisable to leave it standing in the cooking space. There is a residual heat here which keeps the food warm and there is also a certain amount of residual moisture inside the hermetically sealed cooking space which keeps the food fresh. Consequently it is advisable to remove the food from the cooking space only just before serving it.

In order to process the food even more intensively, the opening in the cooking space casing can be opened several times for a relatively brief period between two consecutive puffs of steam. This accelerates the drop in pressure in the cooking space and permits fresh hot steam to be introduced sooner into the cooking space. When the cooking space is briefly opened in this way, it is true that some of the steam already injected, which is still relatively hot, escapes, but it enables the next, more energy-laden burst of steam to be introduced more quickly than having to wait until all the thermal energy available in the amount of steam already introduced has been transmitted to the food in the hermetically sealed cooking space. By repeatedly and briefly opening the cooking space valve in this way, the amount of thermal energy required to process the food can be transmitted to the food in a shorter period of time. The overall time needed to process the food in the cooking space is thus reduced. This can result in a reduction of up to 30% of the time required for the transfer of heat without repeatedly opening the cooking space valve.

The heating inside the cooking space can also be switched on between two puffs of steam. In this case, the heating provides the steam with additional thermal energy which can be used to treat the food.

The rotation of the turbine wheel not only ensures that the steam is uniformly distributed in the cooking space, but also that the circulating steam flows over the food and streams into the containers through the openings.

The explosion-like puffs of steam produce sudden increases in pressure in the cooking space, thus creating favorable conditions for the energy-laden steam to penetrate the food to be processed.

In the present process, using the present device, it is possible not only to regenerate frozen or chilled foodstuffs but also to cook freshly prepared dishes. The freshly prepared dishes can, for instance, be baked, toasted, steamed etc.

In the present process, using the present device, food can be regenerated or even cooked in the most gentle way, in the shortest time and with no detrimental effects on the quality. Since only small amounts of steam are effective in the cooking space and since the overall effect on the food depends on the overall number of individual little doses of steam, the amount of thermal energy can be adapted very precisely in the cooking space with no trouble. In these circumstances, it is easy to avoid overcooking the food, for example.

I claim:

1. A process for the preparation of foodstuff, said process comprising the steps of:
   placing the foodstuff in a cooking space;
   hermetically sealing the cooking space; and
   producing bursts of steam in the cooking space so as to cause a sudden increase in pressure within the cooking space of sufficient magnitude that steam penetrates the foodstuff.

2. A process as in claim 1, wherein the peak pressure in the cooking space rises to 0.7 bar upon production of a burst of steam.

3. A process as in claim 1, wherein a subsequent burst of steam is produced when the pressure in the cooking space drops to a first predetermined level.

4. A process as in claim 3, wherein said predetermined level is 0.025 bar.

5. A process as in claim 2, further comprising the step of interrupting the hermetical seal between at least two subsequent bursts of steam.

6. A process of claim 5, wherein the hermetical seal is interrupted for a sufficient length of time to reduce the pressure in the cooking space to a second predetermined level.

7. A process as in claim 6, wherein said second predetermined level is ambient pressure.

8. A process as in claim 5, wherein the hermetical seal is interrupted after a predetermined period of time from a burst of steam.

9. A process as in claim 1, further comprising the step of heating the cooking space between two bursts of steam.

10. A process as in claim 1, wherein bursts of steam are produced at predetermined intervals, and wherein said intervals become longer as said foodstuff becomes warm, and wherein said process is terminated when said intervals exceed a given set time.

11. A process as in claim 1, wherein said process is terminated after a predetermined number of bursts of steam have occurred.

12. A process as in claim 1, wherein bursts of steam are produced at predetermined intervals, and wherein the amount of steam contained within successive bursts is reduced.

13. A process as in claim 1, further comprising the step of circulating steam within the cooking space.

14. A process as in claim 1, wherein steam is produced by introducing measured doses of water into the cooking space, whereby the more water which is introduced, the greater an over-pressure inside the cooking space is produced, and the longer the overpressure is maintained.

15. A process as in claim 1, wherein water is injected or sprayed into the cooking space, and wherein the water is directed against an inside wall of the cooking space.

16. A process as in claim 1, wherein water is injected or sprayed into the cooking space, and wherein the water is directed against a component part of the cooking space.

17. A process as in claim 1, further comprising the step of heating the air within the cooking space before the first burst of steam is produced.

18. A process as in claim 1, wherein the foodstuff is frozen, and wherein said process quickly thaws the frozen foodstuff.

19. A device for the preparation of foodstuff, said device comprising:
   a hermetically sealable cooking space defined by a casing;
   a first opening formed in said casing to allow loading and unloading of foodstuff;
   an outlet formed in a wall of said casing, said outlet having a plate with a nozzle through which water or steam can be directed into said casing; and
   at least one heating element disposed within said casing, the at least one heating element having feeder legs extending through said plate.

20. A device as in claim 19, wherein the nozzle has an outer end extending outside of said cooking space, said outer end being connected to a water source so that small doses of water or steam can be forced into the cooking space via the nozzle.

21. A device as in claim 19, further comprising a thermometer and a pressure sensor disposed within said cooking space.

22. A device as in claim 21, wherein said thermometer is disposed below connecting passages of the feeder legs.

23. A device as in claim 21, wherein said thermometer and said pressure sensor are disposed on said plate.

24. A device as in claim 19, further comprising a second opening formed in a wall of the casing, wherein the cross-section of said second opening is adjustable.

25. A device as in claim 24, wherein said second opening comprises a channel passing through a wall of said casing, and further comprising a valve disposed in said channel which adjusts the cross-section of said channel.

26. A device as in claim 19, further comprising a ventilator having a turbine wheel, said turbine wheel being disposed within said casing.

27. A device as in claim 19, further comprising control means for controlling the function and collaboration of elements of said device.

28. A device as in claim 19, wherein said nozzle is arranged in such a way that an opening of the nozzle is directed into the interior of the cooking space.

29. A device as in claim 19, wherein said nozzle is arranged in such a way that an opening of the nozzle is directed against one of a component part of the cooking space.

30. A device as in claim 19, wherein said plate has a circular outline, the thickness of the plate being substantially the same as the thickness of the wall of the casing in which the plate is sealed, wherein an exterior wall of said plate has a screw thread, and wherein the plate is screwed into a corresponding thread in said wall of the casing.

31. A device as in claim 19, wherein the foodstuff is contained within a container, said container having a lower hollow part and a lid, the lower hollow part having means for holding the lid, and wherein at least said lid has perforations through which steam can penetrate inside said container.

32. A device as in claim 31, wherein said perforations are formed in a wall of said container.

33. A device as in claim 32, wherein said perforations are formed in a floor of said container.

* * * * *